Patented June 15, 1954

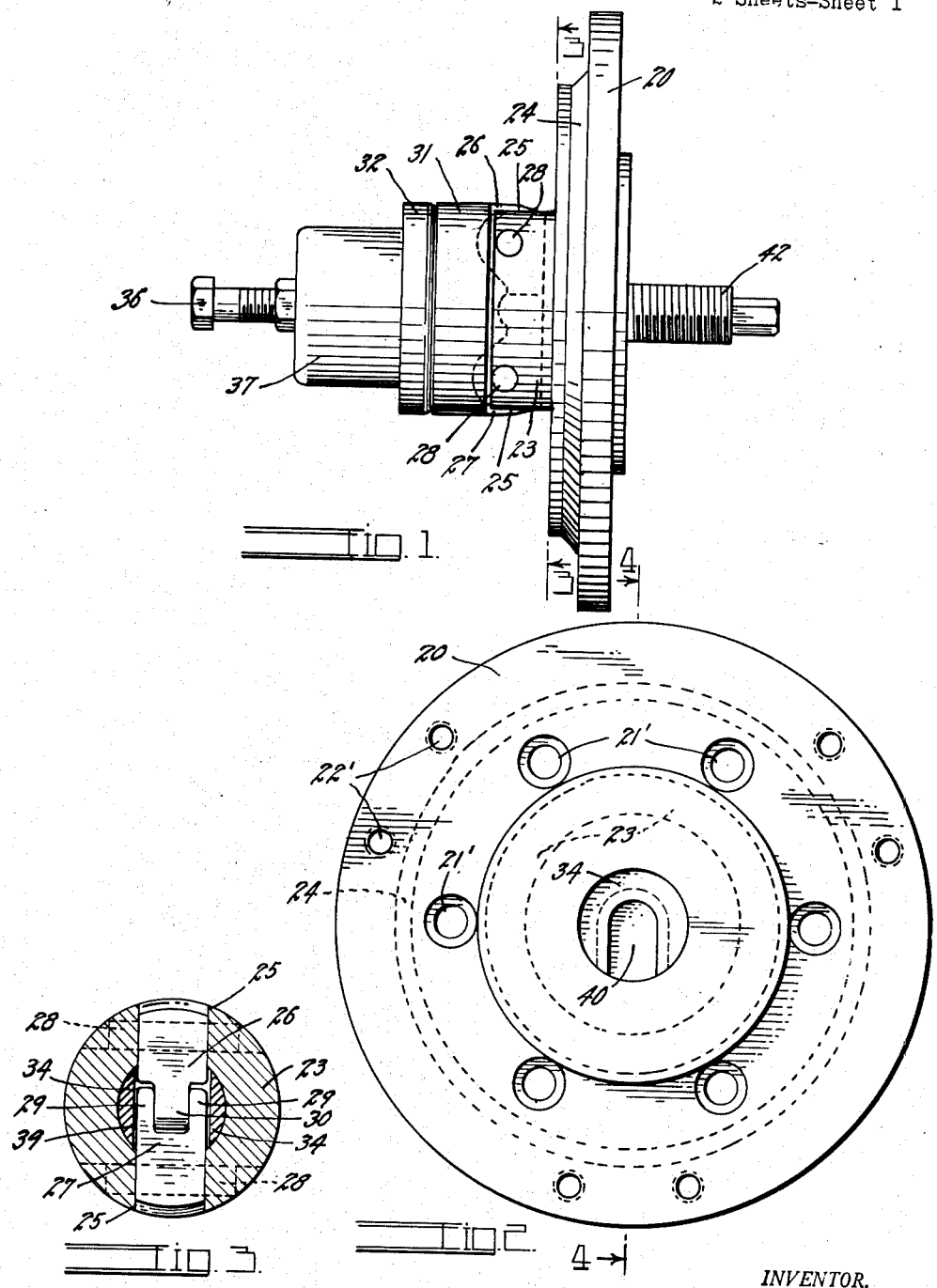

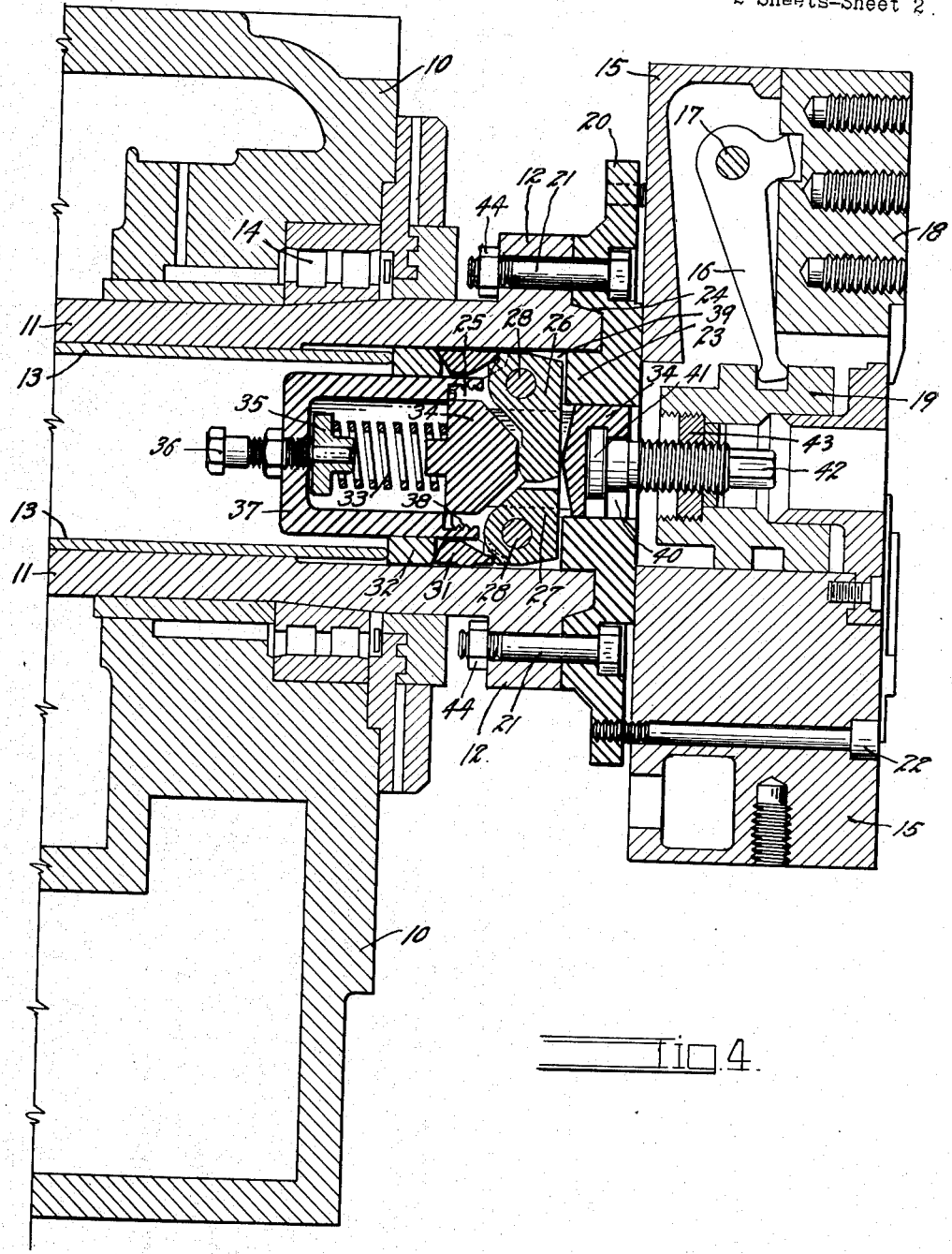

2,681,230

UNITED STATES PATENT OFFICE 2,681,230

AUTOMATIC CHUCK FOR TURRET-TYPE LATHES

Douglas W. Williams, Denver, Colo., assignor to B. K. Sweeney Mfg. Co., Denver, Colo., a corporation of Colorado Application August 11, 1952, Serial No. 303,728

7 Claims. (Cl. 279—119)

This invention relates to a chuck adapter for turret lathes of the type having bar feeding and collet closing equipment.

It is often desirable to convert the collet type headstock of a turret lathe to receive a power-operated standard jaw chuck for use with single piece work. At present this conversion is quite an involved procedure and requires the removal of the collet and all of the collet-operating mechanism from the headstock and the installation of a power-operated, jaw chuck with the complete power mechanism for operating the jaw chuck.

The principal object of this invention is to provide a simple and highly efficient adapter which will enable a power jaw chuck to be quickly and easily interchanged with a collet chuck and which will not only make it unnecessary to remove the collet-operating mechanism from the lathe head but will employ this collet-operating mechanism to actuate the jaws of the power-operated chuck.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved adapter for converting a collet chuck lathe head for use with a power jaw chuck;

Fig. 2 is a face view of the adapter of Fig. 1;

Fig. 3 is a cross-section of the adapter, taken on the line 3—3, Fig. 1; and

Fig. 4 is an enlarged, vertical, longitudinal section of the adapter, taken on the line 4—4, Fig. 2, illustrating it in place in a conventional turret lathe head.

In the drawing, standard parts of a conventional turret lathe head are illustrated and designated by numeral as follows: lathe head casting or headstock 10, hollow spindle 11, spindle nose flange 12, tubular chuck plunger 13, and spindle bearings 14.

In the conventional turret lathe headstock of the "push-out" collet type, the tubular chuck plunger 13 acts against a collet stem to force the collet forwardly to contract the latter in the wedging collet head. With the use of this invention, the plunger 13 may be employed to operate a power-operated jaw chuck of the "Cushman" type.

Conventional parts of a standard power-operated chuck are designated on the drawing by numeral as follows: chuck body 15, jaw levers 16, jaw lever pins 17, chuck jaw blocks 18, and plunger spool 19. For the uses of this invention a face plate 20 is concentrically mounted on the back of the chuck body 15 by means of suitable cap screws 22 or in any other desired manner.

To apply the improved adapter to the headstock 10, it is only necessary to remove the usual collet and collet head from the nose of the spindle 11 and bolt the face plate 20 to the spindle nose flange 12 by means of suitable attachment bolts 21 provided with threaded clamping nuts 44. The face plate 20 is formed with an axially-positioned, tubular guide hub 23 which extends rearwardly into the nose of the spindle 11. A beveled shoulder 24 on the face plate wedges against the beveled extremity usually formed on a conventional spindle to center the face plate thereon.

The rear extremity of the tubular hub 23 is diametrically slotted, as indicated by the slot 25, to receive two lever dogs 26 and 27 which are pivotally mounted on pivot pins 28 extending across the slot 25. The inner extremities of the lever dogs 26 and 27 extend inwardly across the axis of the hub 23, and the inner extremity of the dog 27 is bifurcated, as shown at 29, to pass on opposite sides of a reduced inner extremity 30 formed on the dog 26. The outer extremities of the lever dogs 26 and 27 are rounded and positioned adjacent the periphery of the hub 23.

The inner extremity of the hub 23 is reduced in diameter to receive an encircling pressure ring 31 positioned to contact the outer extremities of the dogs 26 and 27. The pressure ring 31 obtains its thrust to actuate the dogs through the medium of a spacer ring 32 against which the extremity of the tubular plunger 13 bears.

The inner extremities of the dogs 26 and 27 are constantly urged forwardly by means of a compression spring 33, which is compressed between a cylindrical plunger block 34 and a spring bushing 35. The bushing 35 is mounted on a spring adjusting screw 36 which is axially threaded through the bottom of an enclosing spring cup 37. The spring cup 37 is threaded at its forward extremity onto the reduced rear extremity of the hub 23, as indicated by the threads 38.

The cylindrical plunger block 34 is provided with a diametrically extending passage 39 into which the extremities of the dogs 26 and 27 project. The passage 39 is so contoured that its front and back walls will contact the fronts and backs of the inner extremities of the dogs 26 and 27 at the axis of the hub 23.

The forward extremity of the plunger block 34 is provided with a shouldered radial slot 40 for receiving the head 41 of a chuck adjusting screw 42. The chuck adjusting screw 42 is threaded through an adapter bushing 43 which is threaded into the rear extremity of the plunger spool 19 of the conventional power chuck.

In the usual turret lathe the plunger tube 13 is forced forwardly in the spindle 11 to close a collet by means of either an operator's lever or a fluid pressure mechanism. In this invention, the same forcing mechanism and the same plunger tube are employed for closing the jaws of a conventional power jaw chuck.

Forward movement of the plunger tube 13 forces the spacer ring 32 against the pressure ring 31, causing the latter to urge the outer extremities of the dogs 26 and 27 forwardly and the inner extremities thereof rearwardly. The inner extremities, in moving rearwardly, carry the plunger block 34 rearwardly against the action of the spring 33.

The rearward movement of the plunger block 34 is communicated to the plunger spool 19 through the medium of the chuck adjusting screw 42. This rearward movement swings the axial extremities of the jaw levers 16 rearwardly, causing the jaw levers 16 to move the chuck jaw blocks 18 radially inward to grip the work.

When the power chuck is no longer needed, the entire mechanism can be quickly and easily removed by simply removing the nuts 44 and withdrawing the hub 23 with its rings 31 and 32 from the spindle 11 to allow the conventional collet mechanism to be reinserted in the latter.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A chuck adapter for turret lathes of the type having a tubular spindle, a head on the spindle, and a tubular chuck plunger tube within the spindle, said adapter comprising: a face plate; designed for attachment to the spindle head; an internal tubular hub concentrically formed on the rear face of said face plate and adapted to enter the spindle; an axially reciprocal plunger block in said hub; spring-controlled mechanism carried as a unit by said hub for reciprocating said plunger block in consequence of the reciprocation of the chuck plunger tube; means for supporting a jaw chuck on said face plate; and means transmitting the reciprocal movements of said plunger block into operational movements for the chuck.

2. A chuck adapter for turret lathes as described in claim 1 in which said mechanism for reciprocating said plunger block comprises: a pivot member mounted in and extending transversally of said hub at each side of said plunger block; a lever dog pivotally mounted on each pivot member, said lever dogs extending into said plunger block at their inner extremities; and a pressure ring surrounding said hub in contact with the outer extremities of said lever dogs and acting to swing said lever dogs in consequence of the reciprocal movements of said chuck plunger, to cause said dogs to reciprocate said plunger block.

3. A chuck adapter for turret lathes as described in claim 2 in which the chuck plunger acts to force the inner extremities of said dogs inwardly to retract said plunger block, said mechanism having a spring acting against said plunger block and acting to constantly urge said plunger block outwardly.

4. A chuck adapter for turret lathes as described in claim 3 having a spring cup detachably and axially mounted on the inner extremity of said hub and enclosing said spring; and adjustable means in said cup for adjusting the action of said spring.

5. A chuck adapter for turret lathes as described in claim 4 having a spacing ring surrounding said spring cup and acting to transmit mechanical pressure from said chuck plunger to said pressure ring.

6. An adapter for supporting a jaw chuck, of the type having a reciprocal plunger spool arranged when axially reciprocated to actuate work-gripping jaws on the chuck from the nose of a conventional tubular turret lathe spindle, said adapter comprising: a face plate; means for concentrically supporting said jaw chuck on said face plate; an axially positioned tubular hub extending rearwardly from, and communicating through, said face plate; a plunger block mounted for axial movement in said hub; a chuck-adjusting screw rotatably mounted in and extending axially outward from said plunger block; a bushing designed to be mounted in the plunger spool and through which said screw can be threaded so that rotation of said screw can reciprocate the spool; and means for axially reciprocating said plunger block.

7. An adapter for supporting a jaw chuck as described in claim 6 having means for attaching said face plate to the turret spindle nose, with said hub arranged to extend into the spindle; a lever dog pivoted in said hub at each side of said plunger block; a pressure ring acting against the outer extremities of said lever dogs to force the inner extremities of the latter inwardly to retract said plunger block; and spring means acting against said plunger block and constantly urging the latter outwardly.

References Cited in the file of this patent

UNITED STATES PATENTS

| Number | Name | Date |
| --- | --- | --- |
| 608,449 | Gauthier | Aug. 2, 1898 |
| 629,713 | Couch | July 25, 1899 |
| 1,699,358 | Hay | Jan. 15, 1929 |
| 1,849,546 | Lippard | Mar. 15, 1932 |
| 1,999,032 | Borger et al. | Apr. 23, 1935 |
| 2,384,302 | Harrison | Sept. 4, 1945 |